United States Patent [19]

Derderian

[11] 4,029,005
[45] June 14, 1977

[54] STEMMING MACHINE

[76] Inventor: Edward J. Derderian, 4514 N. Wilson Ave., Fresno, Calif. 93704

[22] Filed: Apr. 28, 1975

[21] Appl. No.: 571,916

Related U.S. Application Data

[63] Continuation-in-part of Ser. No. 435,829, Jan. 23, 1974, abandoned.

[52] U.S. Cl. .................................................. 99/639
[51] Int. Cl.² ........................................ A23N 15/02
[58] Field of Search ................ 99/639, 637, 640

[56] References Cited

UNITED STATES PATENTS

| | | | |
|---|---|---|---|
| 600,554 | 3/1898 | Sanborn | 99/639 |
| 639,152 | 12/1899 | Cox | 99/639 |
| 1,298,488 | 3/1919 | Foote | 99/639 |
| 1,762,684 | 6/1930 | Frazier | 99/639 |
| 1,924,111 | 8/1933 | Erickson | 99/637 |
| 1,966,680 | 7/1934 | Payne | 99/637 |
| 2,104,785 | 1/1938 | Akeyson | 209/308 |
| 2,152,143 | 3/1939 | Martin | 99/637 |
| 2,621,690 | 2/1952 | Urschel | 99/639 |
| 2,693,834 | 11/1954 | Frova | 99/639 |
| 3,159,270 | 12/1964 | Johnston | 209/308 |
| 3,354,923 | 11/1967 | Voller | 99/637 |

FOREIGN PATENTS OR APPLICATIONS 152,243   7/1953   Australia ...................... 99/639

*Primary Examiner*—Harry N. Haroian
*Attorney, Agent, or Firm*—Huebner & Worrel

[57] ABSTRACT

A stemming machine for separating raisins from mother stems, characterized by a stem conveyor including an open-mesh endless belt having an upper, horizontal run through which raisins separated from mother stems are permitted to drop, a separator station including a shaker frame disposed beneath one end portion of the open-mesh belt for imparting thereto vibratory motion, whereby the raisins are separated from their mother stems at said station and permitted to drop through the open-mesh belt, a raisin conveyor characterized by an endless belt having an upper, horizontal run passing beneath said open-mesh belt at said station for receiving the separated raisins, and a perforated tumbler disposed above the raisin conveyor and inclined downwardly toward the separator station for delivering thereto fractured, raisin-bearing stems.

8 Claims, 7 Drawing Figures

STEMMING MACHINE

CROSS-REFERENCE TO RELATED APPLICATION

This application is a continuation-in-part application of copending application Ser. No. 435,829, filed Jan. 23, 1974, now abandoned.

BACKGROUND OF THE INVENTION

1. Field of the Invention

The invention generally relates to machines for processing raisins and similar products, and more particularly to a stemming machine for separating raisins from mother stems.

It is to be understood that the term "mother stems," as herein employed, refers to bunch stems including lateral stems and their branches, while the term "cap stems" is employed to designate those stems which serve to attach raisins at their caps to the mother stems.

2. Description of the Prior Art

The prior art is, of course, replete with machines for cleaning agricultural products, such as raisins and the like. However, machines heretofore employed in separating raisins from mother stems generally are complex in structure, expensive to manufacture, and have a propensity to tear cap stems from raisins, as separation occurs, thus creating minute wounds from which sugar exudes and through which microorganisms are afforded entry resulting in spoilage. Therefore, there currently exists a need for a stemming machine which is economic to manufacture and employ, and yet possesses a capability for safely and effectively separating raisins from mother stems.

It is therefore a general purpose of the instant invention to provide an improved, high-capacity stemming machine capable of safely separating raisins and the like from mother stems without tearing the cap stems therefrom.

OBJECTS AND SUMMARY OF THE INVENTION

It is an object of the instant invention to provide an improved stemming machine for safely separating raisins from mother stems.

It is another object to provide an improved, high-capacity stemming machine which is efficient in operation and simple and economic to manufacture and employ.

It is another object to provide an improved stemming machine having a capability of separating raisins from mother stems substantially without inflicting minute wounds from which sugar exudes and through which spoilage-inducing microorganisms gain entry.

Another object is to provide an improved stemming machine for separating the raisins from the mother stems wherein cap stems are broken in close proximity to the raisins without tearing the skin thereof.

It is another object to provide in a stemming machine for separating raisins from mother stems a rotatable tumbler for fracturing the stems, first conveyor for receiving from said tumbler fractured, raisin-bearing stems, a vibrator located at a separator station for imparting motion to the raisin-bearing mother stems for separating the raisins therefrom, a second conveyor passing beneath the first conveyor for receiving from said first conveyor raisins separated from their mother stems, and drive means for simultaneously imparting motion to said tumbler, said conveyors, and said vibrator.

These and other objects and advantages are achieved through a use of a rotatable tumbler for fracturing mother stems, a stem conveyor which includes an open-mesh belt for receiving fractured, raisin-bearing mother stems, a vibrator having a horizontally disposed shaker frame arranged in supporting relation to the open-mesh belt for shaking the mother stems whereby the cap stems are broken and the raisins are separated from the mother stems, a raisin conveyor including a belt having an upper run extended beneath the shaker frame for receiving separated raisins, and means for simultaneously imparting driven motion to said tumbler, said belts and said shaker frame, as will become more readily apparent by reference to the following description and claims in light of the accompanying drawings.

DESCRIPTION OF THE PREFERRED EMBODIMENT

Figure 1:
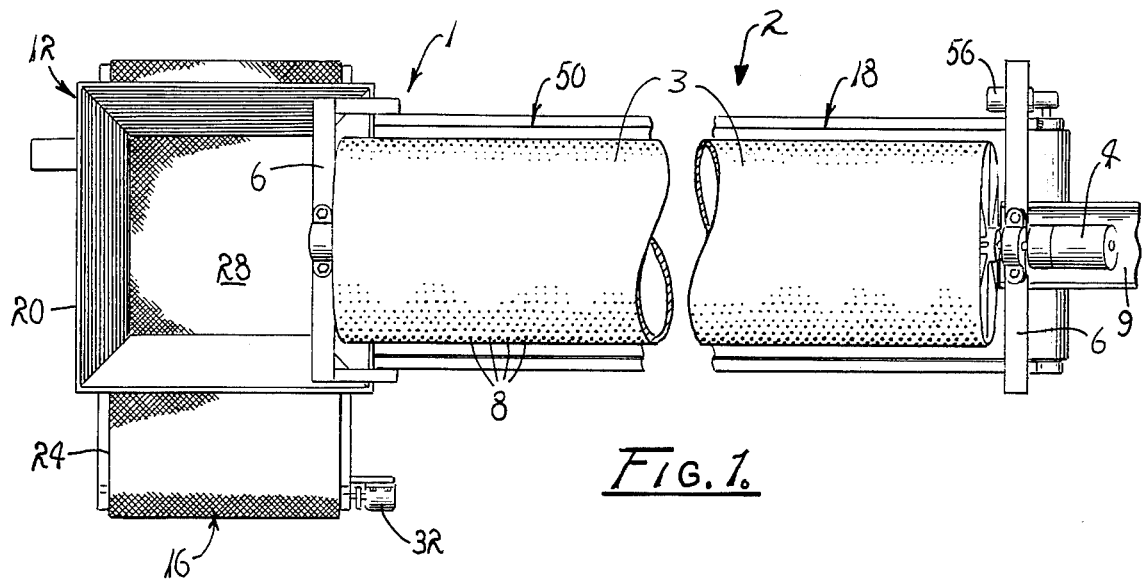
FIG. 1 is a top plan view of a stemming machine which embodies the principles of the instant invention, illustrating a stem conveyor, a raisin conveyor, a vibrator interposed therebetween at a separator station, and a tumbler disposed above the raisin conveyor in an inclined relationship with the vibrator.
Figure 2:
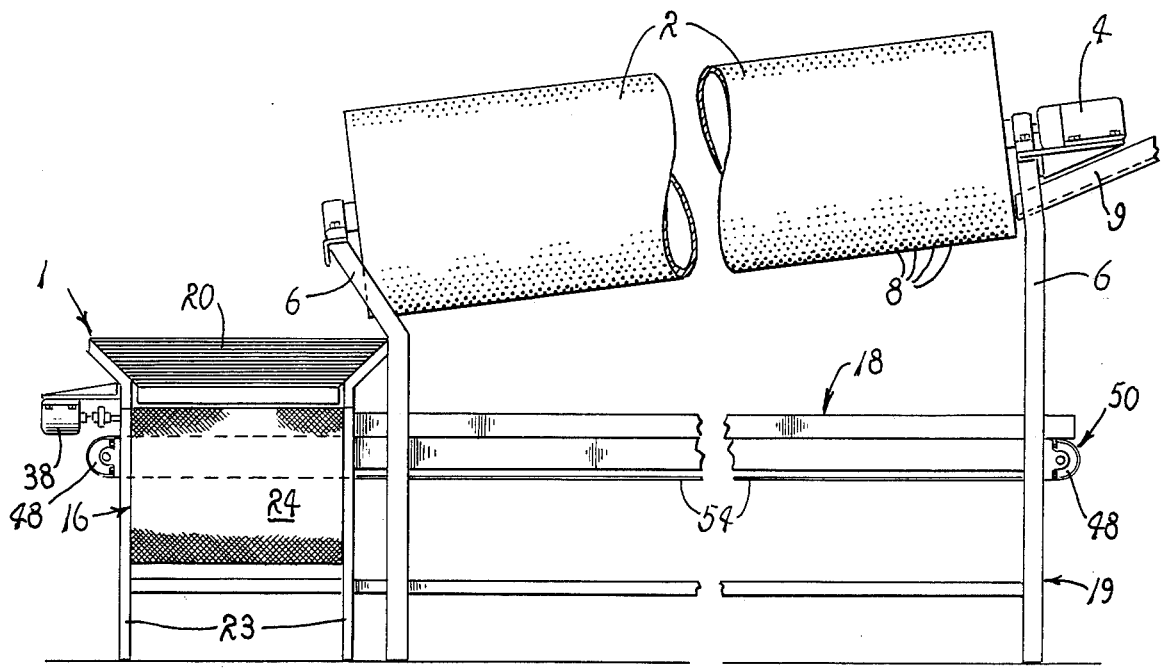
FIG. 2 is a side elevational view of the stemming machine shown in FIG. 1.

Referring now to the drawings wherein like reference characters designate like or corresponding parts throughout the separate views, there is shown in FIG. 1 a stemming machine, generally designated 1, which embodies the principles of the instant invention.

The stemming machine 1 includes a tumbler, generally designated 2, having an elongated drum 3 into which raisin-bearing mother stems are introduced and thereafter fractured as rotation is imparted to the tumbler. An electrically energizable motor 4 is suitably coupled with the drum 3 and serves to drive the drum in rotation as it is supported by suitable journals, not designated, mounted on a framework 6 adapted to support the tumbler in an inclined disposition relative to vertical.

Preferably, the drum 3 is of an open-ended, cylindrical configuration and includes a myriad of perforations 8, each being suitably dimensioned for accommodating a passage therethrough of raisins previously separated from their mother stems through handling and the like. An inclined delivery chute 9 is mounted on the framework 6 and serves to facilitate an introduction, at the uppermost end of the drum 3, of bulk quantities of raisin-bearing mother stems into the tumbler. The lowermost end of the drum normally is open and accommodates free-fall gravitational discharge of fractured stems and raisins from the tumbler 2 to a separator station 12. At this station, a separation of raisins from their mother stems is achieved in response to vigorous vibratory motion imparted thereto by a vibrator 14, hereinafter more fully described, while the fractured raisin-bearing stems are supported by a raisin conveyor 16 which serves to receive the raisin-bearing stems at the separator station, subsequent to being discharged from the tumbler 2.

In order to recover raisins thus separated, there is provided a raisin conveyor 18 which extends beneath the drum 3 of the tumbler 2, along the length thereof, and passes beneath the stem conveyor 16 at the separator station 12, as will hereinafter become more fully understood.

As a practical matter, the machine 1 is supported in an upright orientation by a frame 19. Upon this frame, at the separator station 12, there is provided a chute 20 mounted on supports 22 and positioned immediately above and in close proximity with the stem conveyor 16. The supports 22 are affixed to a plurality of upright members 23 interconnected in the frame 19. Of course, the frame 19 is fabricated in any suitable manner, from suitable materials, as by welding or the like.

Figure 5:
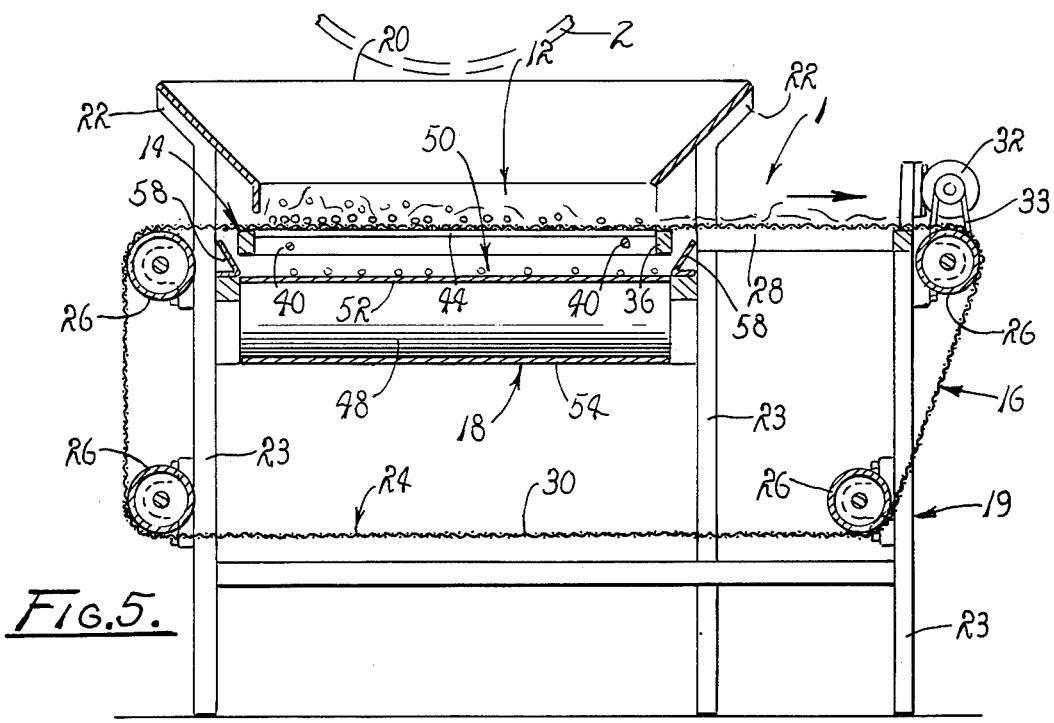
FIG. 5 is a sectioned end elevational view.
Figure 6:
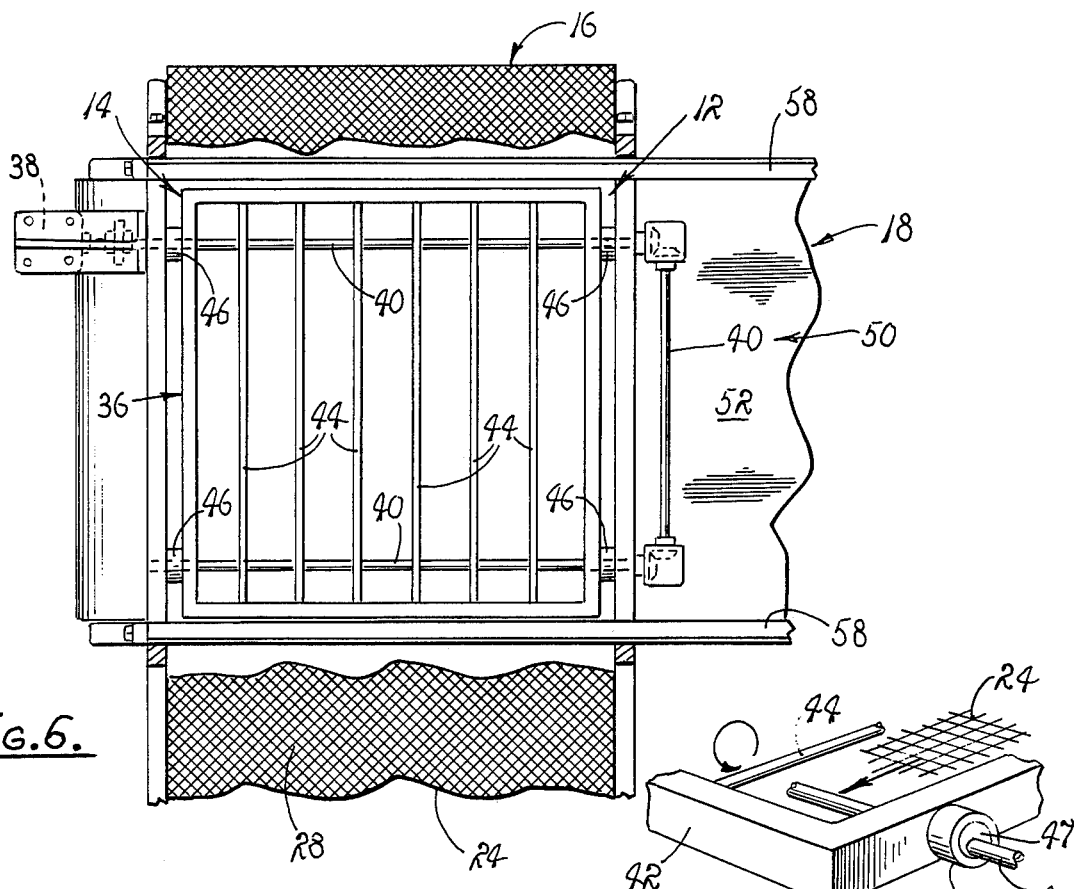
FIG. 6 is a fragmented top plan view, taken generally along line 6—6 of FIG. 4, illustrating the vibrator.

As shown in FIG. 5, the stem conveyor 16 includes an endless belt 24 trained about a plurality of mutually spaced support rolls 26 over which the belt 24 is trained, and the belt 24 includes an upper horizontal run 28 and a lower horizontal run 30 supported in vertically spaced parallelism by the rolls 26. The rolls 26 are, in turn, mounted on the frame 19 through suitable journals, also not designated. An electrically energizable drive-motor 32 mounted on the frame is coupled through a drive-link 33 to a selected one of the rolls 26 so that this roll is caused to function as a drive roll for the belt. While the drive-link 33, as illustrated, comprises a belt-and-sheave coupling, it is to be understood that a gear train or a chain-and-sprocket coupling can be employed, for this purpose, equally as well. Moreover, it should be understood that as rotary motion is imparted to the selected roll 26, by the motor 32, the belt 24 of the stem conveyor 16 is caused to advance continuously along an endless and substantially rectangular path defined in a vertical plane. Due to the configuration of the chute 20, as well as its close proximity to the belt 24, the chute is caused to corral the mother stems at the separator station as vibratory motion is imparted thereto.

It is important here to note that the belt 24 is fabricated from an open-mesh stock material suitably dimensioned for accommodating passage of raisins therethrough. Preferably, the belt is formed from chain-link stock having one-inch square openings formed therein which serve to accommodate a passage therethrough of raisins after the raisins have been separated from their mother stems at the separator station 12. Of course, the resulting residue of mother stems is supported on the upper surface of the belt 24 and is transported away from the separator station as the belt 24 is caused to advance along the substantially rectangular path.

The vibrator 14 includes a shaker frame, generally designated 36, driven by an electrically energizable drive-motor 38 coupled thereto through an articulated drive shaft 40. The shaker frame 36 preferably includes a rectangular base member 42 having a plurality of mutually spaced, coplanar runners 44 traversing the length thereof. In practice, the runners 44 are arranged in parallelism with the longitudinal axis of the conveyor 16 and are secured to the base member 42 at each of the opposite ends thereof, in any suitable manner, and serve to impart vertical support to the belt 24 as the belt is passed across the shaker frame 36.

Figure 7:
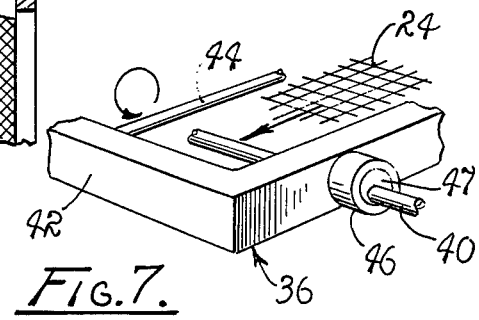
FIG. 7 is a fragmented, perspective view of one corner of the vibrator shown in FIG. 6.

The articulated drive shaft 40 is connected with the shaker frame 36 through eccentric couplings 46, FIG. 7. Each of the couplings includes an eccentric cam 47 rigidly affixed to the shaft 40 and seated in an annular follower 47', FIG. 7, rigidly affixed to the base member 42 so that as the shaft 40 is driven in rotation, by the motor 38, motion along an elliptical path is imparted to the adjacent portion of the shaker frame 36.

The path of the elliptical motion is in a plane paralleling the longitudinal axis of the conveyor 16 and, of course, is transmitted to the belt 24 as the belt advances along the runners 44. Since the path of the motion imparted to the frame 36 parallels the longitudinal axis of the conveyor 16, the stem residue flows from the separator station 12 with minimal turbulence, whereby fouling is obviated, and efficiency in operation enhanced.

Consequently, it should be appreciated that raisins deposited on the stem conveyor 16, at the separator station 12, are subjected to severe vibration due to the effects of the shaker frame 36 acting on the belt 24. It also is important to understand that the vibration thus imparted to the belt 24 is sufficiently severe as to cause the cap stems of the raisins to fracture for thus separating the raisins from the mother stems and fragments thereof. Thus the separation of the raisins from the mother stems is achieved without the skin of the raisins being ruptured or torn.

Once the raisins are separated from the mother stems, they are free to drop through the openings of the mesh of the belt 24. As can be appreciated, the vibration thus imparted to the stems not only serves to separate the raisins from the mother stems, by fracturing the cap stems, but also enhances gravitational separation of the raisins from the stem residue.

In order to capture the raisins, as they drop through the openings of the belt 24 of the stem conveyor 16, the raisins are permitted to fall onto the upper surface of the raisin conveyor 18, the longitudinal axis of which is orthogonally related to the longitudinal axis of the stem conveyor 16. The raisin conveyor includes a pair of laterally spaced support rolls 48 about which is trained a flexible belt 50. The belt 50 is so supported by the rolls 48 that at least one end thereof is interposed between the upper horizontal run 28 and the lower horizontal run 30 of the belt 24 of the stem conveyor 16. Thus, the raisin conveyor 18 is, in effect, horizontally extended through the vertical plane of the stem conveyor 16 beneath the shaker frame 36.

The belt 50 includes an upper run 52 supported by a suitable track, not designated, and a lower run 54, also supported by a suitable track, not designated. Hence, as raisins are dislodged from mother stems, as a consequence of the vibratory motion imparted to the belt 24 at the separating station 12, and/or the motion of the tumbler 2, the raisins are delivered to and received upon the upper surface of the upper run 52 of the belt 50 and thereafter conveyed thereby to a suitable receiver, such as a gondola, conveyor unit, or the like, not shown.

Figure 3:
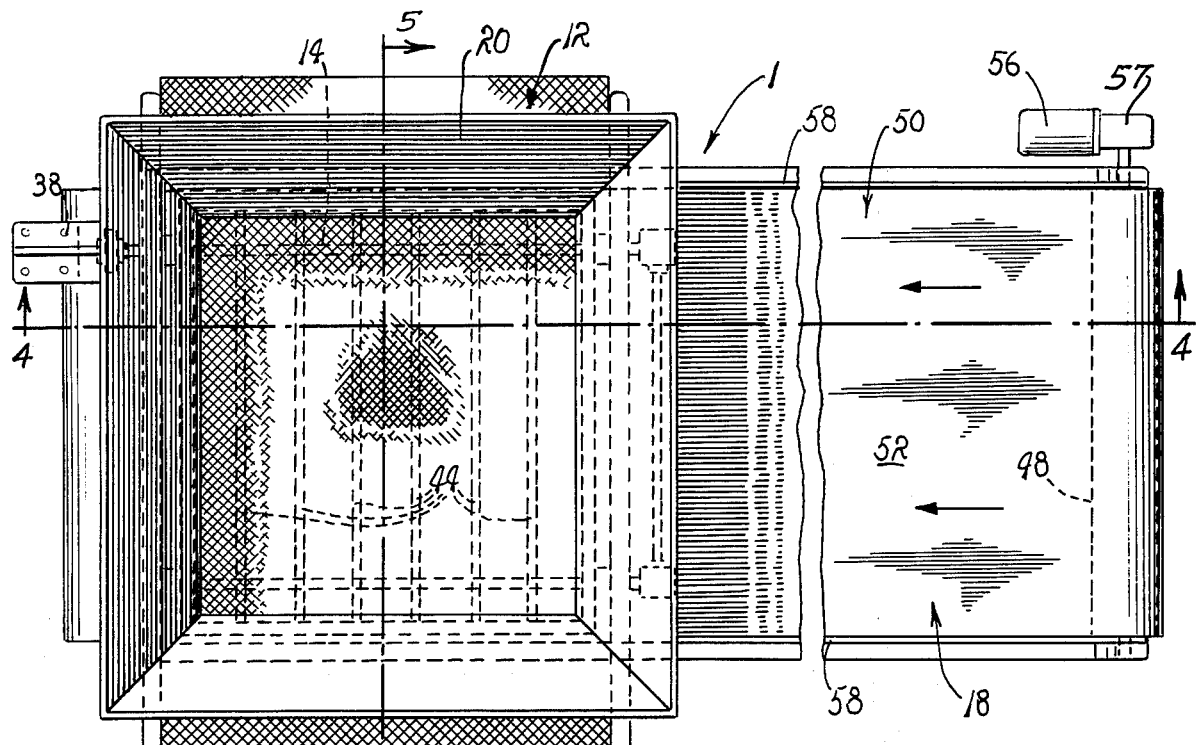
FIG. 3 is a top plan view of the machine shown in FIG. 1, but on an enlarged scale with the tumbler having been removed for the sake of clarity.
Figure 4:
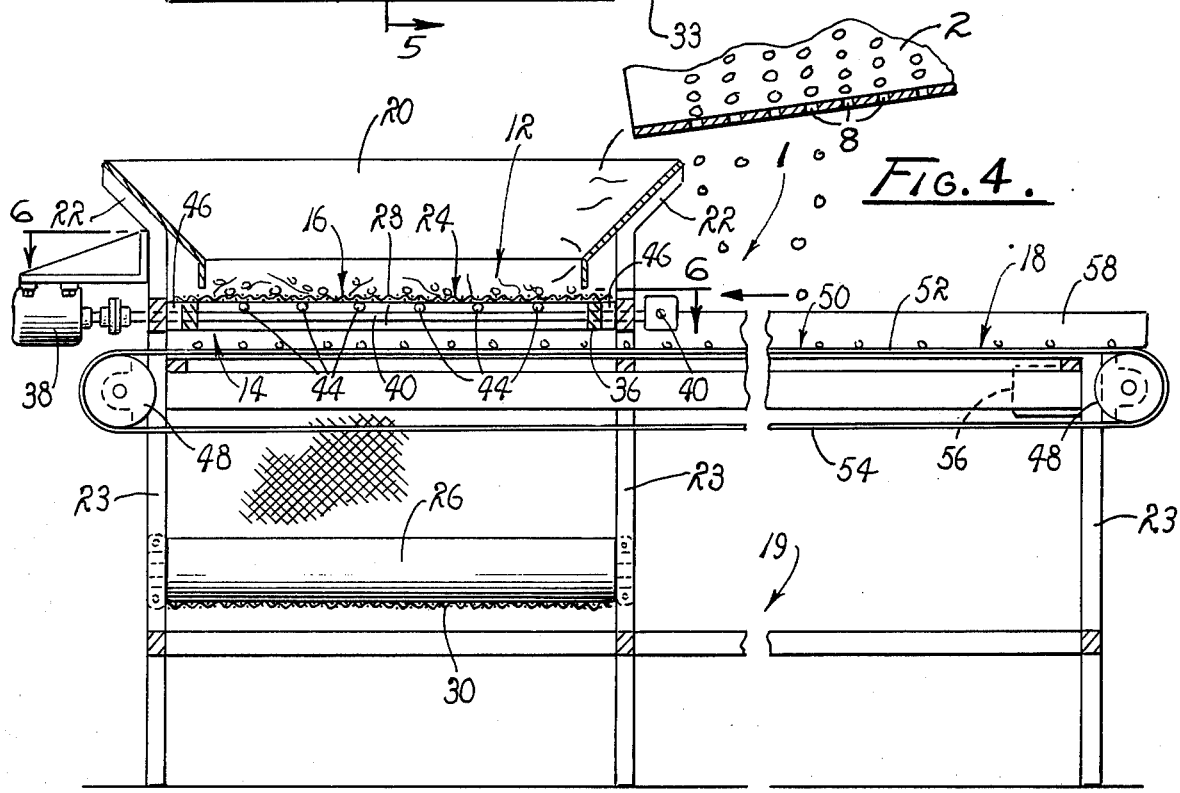
FIG. 4 is a sectioned, fragmented side view of the stemming machine, taken generally along line 4—4 of FIG. 3, including, for the sake of clarity, a fragmented illustration of a portion of the tumbler shown in FIG. 1.

An electrically energizable drive-motor 56 is mounted on the frame 19 and connected with a selected one of rolls 48 through a gear box 57, FIG. 3.

The motor 56 serves to impart rotary motion to the selected roll so that the belt 50 of the conveyor 18 is caused to advance unidirectionally along an endless path. In order to prevent the raisins from being dislodged from the belt 50, and the belt is advanced, suitable shed boards 58, disposed at suitable angles of inclination, are extended along the opposite side edges of the belt 50.

While not shown, it is to be understood that motors 4, 32, 38 and 56 are electrically connected with a source of electrical energy, through suitable circuitry, which permits the motors to be energized concurrently so that the tumbler 2, the stem conveyor 16, the raisin conveyor 18 and the vibrator 14 are driven simultaneously.

OPERATION

It is believed that in view of the foregoing description, the operation of the stemming machine will readily be understood, however, it will be briefly reviewed at this point.

With the stemming machine 1 assembled in the manner hereinbefore described it can readily and easily be employed for separating raisins from mother stems, presented thereto in bulk form, by fracturing the cap stems. Moreover, such separation is achieved without subjecting the raisins to a tearing or a rupturing of the skin of the raisins whereby loss of sugar from and spoilage of the raisins are avoided.

In order to employ the stemming machine 1, the motors 4, 32, 38 and 56 are energized concurrently for simultaneously imparting motion to the drum 3 of the tumbler 2, the conveyors 16 and 18, and the vibrator 34. With the machine 1 thus activated, the tumbler 2 is charged through a delivery to the drum 3 of a quantity of raisin-bearing mother stems in bulk form. In practice, this is achieved by delivery of such stems along the chute 9 from a suitable source, such as conveyor belt, not shown. The drum 3, as it rotates about its longitudinal axis, causes the raisin-bearing mother stems to fracture, or shatter, with a substantial quantity of the raisins being permitted to drop to the belt 50 of the raisin conveyor 18, via the perforations 8 of the tumbler. The fractured stems and raisins, both loose and those attached to the stems, gravitate downwardly through the rotating tumbler and are discharged therefrom into the chute 20 at the station 12. The majority of the raisins thus fed to the station 12 are adhered to their mother stems through their cap stems. As the raisins pass downwardly through the chute 20, they are deposited on the belt 24, of the stem conveyor 16, immediately above the shaker frame 36 of the vibrator 14. With the motor 38 in operation, the shaker frame 36 is caused to vibrate at a rate sufficient to fracture the cap stems, whereupon the raisins are thus separated from their mother stems.

Upon separation from their mother stems, the raisins are permitted to fall through the mesh openings of the belt 24, whereupon they are received by the uppermost surface of the belt 50 of the conveyor 18. With the motors 32 and 56 concurrently activated, the belts 24 and 50 are advanced along orthogonally related paths so that the residue of the mother stems is conveyed away from the separating station 12, by the stem conveyor 16, while the raisins are conveyed away from the separating station 12 by the raisin conveyor 18.

While not shown, it is to be understood that the residue of the mother stems is discharged from the conveyor 16 at the end thereof remote from the chute 20, while the raisins are discharged from the raisin conveyor 18 at a collecting station located adjacent the end of the upper horizontal run 52 toward which the belt 54 is advanced.

Of course, it is to be further understood that fragments of the cap stems adhered to the raisins are removed through subsequent operations performed in a manner and by a machine which forms no part of the instant invention.

In view of the foregoing, it should readily be apparent that the machine which embodies the principles of the instant invention provides a practical solution to a perplexing problem of separating raisins from mother stems without subjecting the raisins to damage through which loss of sugar or spoilage is initiated through a rupture of the skin of the raisins near the caps thereof.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A stemming machine for separating raisins from mother stems comprising:
   A. first means including a tumbler for fracturing raisin-bearing mother stems comprising a drum of a substantially open-end, cylindrical configuration supported for rotation about an inclined axis, and means defining in the wall of said drum a plurality of radially extended openings suitably dimensioned for accommodating gravitational discharge from the drum;
   B. second means including an endless belt for receiving from said tumbler raisins adhered to fractured mother stems comprising a flat, open-mesh belt including a myriad of openings for accommodating gravitational discharge of raisins therethrough;
   C. third means for separating raisins from fractured mother stems including a vibrator comprising a horizontally oriented shaker frame disposed beneath the upper horizontal run of the belt of said open-mesh belt, in engaged relation therewith; and
   D. fourth means for receiving raisins separated from the mother stems including an endless belt angularly related to the open-mesh belt having an upper horizontal run passing beneath said shaker frame.

2. The machine of claim 1 wherein said shaker frame is characterized by a plurality of horizontally oriented, coplanar runners disposed in supporting engagement with the upper horizontal run of the endless belt of said second means.

3. The machine of claim 2 wherein each opening included in the open-mesh belt is suitably dimensioned for accommodating passage therethrough of raisins having fragments of cap stems adhered thereto, while a passage therethrough of mother stems from which the raisins are separated is simultaneously restricted.

4. The machine of claim 1 further comprising means for imparting angular motion to said drum about said inclined axis.

5. The machine of claim 4 wherein said inclined axis is disposed in coplanar relation with the longitudinal axis of symmetry for the endless belt of said second receiving means.

6. In a raisin stemming machine for separating raisins from mother stems the improvement comprising:

A. means defining an upright base;
B. a stem conveyor supported by said base including an open-mesh endless belt having an upper, horizontal run and characterized by a myriad of openings for discharging raisins separated from mother stems;
C. vibrator means for imparting vibratory motion to said stem conveyor including a shaker frame characterized by a plurality of horizontally oriented, coplanar runners disposed in supporting engagement with the upper run of said open-mesh belt and means for imparting elliptical motion to said frame;
D. a raisin conveyor orthogonally related to said stem conveyor characterized by an endless belt having an upper, horizontal run passing beneath said vibrator means for receiving raisins discharged through said open-mesh endless belt; and
E. means for simultaneously imparting motion to said stem conveyor, said raisin conveyor, and said vibrator.

7. The machine of claim 6 wherein said runners are advanced along an elliptical path paralleling the longitudinal axis of the stem conveyor.

8. The machine of claim 6 further comprising means including a rotatable drum for delivering fractured raisin-bearing mother stems to said stem conveyor.

* * * * *